(12) United States Patent
Park et al.

(10) Patent No.: US 8,740,545 B2
(45) Date of Patent: Jun. 3, 2014

(54) MAINTENANCE SYSTEM OF HELICAL TURBINE

(75) Inventors: Jin Soon Park, Ansan-si (KR); Kwang Soo Lee, Seoul (KR); Ki Dai Yum, Seoul (KR); Seong Eun Kim, Ansan-si (KR); Myoung Hak Oh, Yongin-si (KR); Choong Beom Lee, Paju-si (KR); Hyung Jin An, Incheon (KR)

(73) Assignee: Korea Ocean Research and Development Institute (KORDI), Ansan-si, Gyeonggi-do (KR)

( * ) Notice: Subject to any disclaimer, the term of this patent is extended or adjusted under 35 U.S.C. 154(b) by 957 days.

(21) Appl. No.: 12/744,315

(22) PCT Filed: Nov. 21, 2008

(86) PCT No.: PCT/KR2008/006905
§ 371 (c)(1),
(2), (4) Date: Dec. 10, 2010

(87) PCT Pub. No.: WO2009/066965
PCT Pub. Date: May 28, 2009

(65) Prior Publication Data
US 2011/0158789 A1    Jun. 30, 2011

(30) Foreign Application Priority Data
Nov. 23, 2007    (KR) .................. 10-2007-0120336

(51) Int. Cl.
*F03B 13/12*    (2006.01)
(52) U.S. Cl.
USPC ............... 415/4.2; 415/4.4; 415/71; 415/907; 416/176
(58) Field of Classification Search
USPC ............. 415/3.1, 4.2, 4.4, 31, 71, 213.1, 224, 415/228, 906, 907; 416/176, 198 R, DIG. 4; 290/43, 54
See application file for complete search history.

(56) References Cited

U.S. PATENT DOCUMENTS 8,123,482 B2 *  2/2012  Achard et al. ................ 416/120
8,308,424 B2 * 11/2012  Park et al. ........................ 415/71
(Continued)

FOREIGN PATENT DOCUMENTS

JP    2000-265936    9/2000
JP    2005-337245    12/2005
(Continued)

OTHER PUBLICATIONS

PCT International Search Report for PCT Counterpart Application No. PCT/KR2008/006905 containing Communication relating to the Results of the Partial International Search Report, 2 pgs., (Jul. 14, 2009).

(Continued)

*Primary Examiner* — Edward Look
*Assistant Examiner* — William Grigos
(74) *Attorney, Agent, or Firm* — Blakely, Sokoloff, Taylor & Zafman LLP

(57) ABSTRACT

Disclosed is an assembled helical turbine system, which can strengthen weakenings of a housing assembly, and simultaneously can be easily assembled/disassembled. The assembled helical turbine system comprises the housing assembly including a plurality of bearing spiders for rotatably supporting a rotating shaft of a helical turbine, and a plurality of side posts for connecting and fixing the respective bearing spiders to each other, the side posts being fixed in such a manner as to radially protrude by a predetermined length from peripheral surfaces of the bearing spiders; filling members for filling and reinforcing spaces between the peripheral surfaces of the bearing spiders and outlines of protruding portions of the side posts; and a housing supporter for supporting the housing assembly in such a manner that the housing assembly can be inserted into and withdrawn from the housing supporter, the housing supporter having catch grooves that are recessed in a shape corresponding to stoppers.

4 Claims, 4 Drawing Sheets

(56) References Cited

U.S. PATENT DOCUMENTS

2011/0091312 A1\* 4/2011 Park et al. .................. 415/73
2011/0158789 A1 6/2011 Park et al.

FOREIGN PATENT DOCUMENTS

| | | |
|---|---|---|
| JP | 2006-097419 | 4/2006 |
| JP | 2006-291868 | 10/2006 |
| KR | 0392106 | 8/2005 |
| KR | 0774308 | 11/2007 |

OTHER PUBLICATIONS

PCT International Search Report for PCT Counterpart Application No. PCT/KR2008/006906 containing Communication relating to the Results of the Partial International Search Report, 2 pgs., (Jul. 9, 2009).

\* cited by examiner

MAINTENANCE SYSTEM OF HELICAL TURBINE

CROSS-REFERENCE TO RELATED APPLICATIONS

This patent application is a U.S. National Phase application under 35 U.S.C. §371 of International Application No. PCT/KR2008/006905, filed on Nov. 21, 2008, entitled MAINTENANCE SYSTEM OF HELICAL TURBINE, which claims priority to Korean patent application number 10-2007-0120336, filed Nov. 23, 2007.

TECHNICAL FIELD

The present invention relates to an assembled helical turbine system, and more particularly to an assembled helical turbine system, which can be assembled/disassembled without being hindered by a rotational force caused by the flow of tidal currents during its assembly/disassembly process, and simultaneously can be strengthened by mounting filling members in weakenings where bearing spiders for supporting a helical turbine are joined to side posts.

BACKGROUND ART

In general, a turbine refers to a machine or an apparatus for converting energy included in fluid, such as water, gas, or steam, into useful mechanical work. An apparatus for generating energy by using such a turbine is mainly used in tidal power generation. In conventional tidal power generation, a tidal dam is built in a back bay, where there is a big difference between the ebb and flow of the tide, to thereby interrupt the movement of sea water, and then electricity is generated using the difference between water levels inside and outside of the tidal dam, which is caused by the difference between the ebb and flow of the tide. This mechanism of tidal power generation is similar to that of hydroelectric power generation.

However, since conventional tidal power generation is driven using potential energy, it requires a water level above a certain height. To this end, it is requisite to build a seawall, which is accompanied by environmental problems including sea water pollution.

To solve these problems, a helical turbine was developed by Professor Alexander M. Gorlov of Northeastern University, USA, and is currently in use. The helical turbine is an apparatus capable of providing rotation under multidirectional fluid flow, as well as unidirectional fluid flow. As illustrated in FIG. 1, such a helical turbine generator includes a frame 120 dipped in fluid, a housing supporter 110 provided in the frame 120 and forming an inner cylindrical space, a housing assembly 140 inserted and fixed in the housing supporter 110, and a helical turbine 130 rotatably mounted in the central portion of the housing assembly 140.

The helical turbine 130 includes a rotating shaft 131 rotatably supported by the housing assembly 140, a plurality of supporting members 132 radially protruding from the rotating shaft 131 while being arranged in layers along the rotating shaft 131, and a blade 133 connected to distal ends of the respective layered supporting members 132, having a streamlined cross section, and helically twisted in the longitudinal direction of the rotating shaft 131.

Also, the housing assembly 140 is inserted and fixed in the inner receiving space of the housing supporter 110.

In the conventional helical turbine generator having the above structure, however, there is a problem in that when the housing assembly 140 supporting the helical turbine 130 is assembled in the inner space of the housing supporter 110, a rotational force continuously acts on the helical turbine 130 due to fluid flow, even during the assembly process, and consequently the housing assembly 140 is rotated in the inner space of the housing supporter 110 by the force applied to the helical turbine 130, which makes it difficult to assemble the housing assembly 140.

Further, when the helical turbine 130 is damaged or worn out during its use, and thus the helical turbine 130 and the housing assembly 140 need to be disassembled from the housing supporter 110, it is also difficult to disassemble the helical turbine 130 and the housing assembly 140 because the helical turbine is continuously rotated.

Further, there is a problem in that weakenings having low strength are generated in the process of assembling the housing assembly 140.

SUMMARY

Accordingly, the present invention has been made to solve at least the above-mentioned problems occurring in the prior art, and an object of the present invention is to provide an assembled helical turbine system, which can be easily assembled/disassembled by preventing a helical turbine from being rotated in its assembly/disassembly process during which a rotational force continuously acts on the helical turbine, and simultaneously can strengthen weakenings that are generated in portions where bearing spiders and side posts constituting a housing assembly are joined together.

In order to accomplish the above object, in accordance with an aspect of the present invention, there is provided an assembled helical turbine system including a helical turbine formed with a plurality of blades in such a manner as to continuously generate a rotational force under unidirectional or multidirectional fluid flow; a housing assembly including a plurality of bearing spiders for rotatably supporting a rotating shaft constituting the helical turbine, and a plurality of side posts for connecting and fixing the respective bearing spiders to each other, the side posts being fixed in such a manner as to radially protrude by a predetermined length from peripheral surfaces of the bearing spiders; filling members for filling and reinforcing spaces between the peripheral surfaces of the bearing spiders and outlines of protruding portions of the side posts; and a housing supporter for supporting the housing assembly in such a manner that the housing assembly can be inserted into and withdrawn from the housing supporter, the housing supporter having catch grooves that are recessed in a shape corresponding to stoppers, that is, the protruding portions of the side posts, so as to fix the stoppers. In this way, portions connecting the bearing spiders and the side posts can be strengthened by the filling members, and simultaneously strength can be increased when the portions connecting the bearing spiders and the side posts come into contact with the catch grooves that are formed in such a manner as to prevent rotation from being caused by the flow of tidal currents during the assembly/disassembly process of the assembled helical turbine system.

Since an assembled helical turbine system according to the present invention is strengthened by mounting filling members in portions connecting bearing spiders and side posts, it can be prevented from being damaged, which results in an increase in product lifetime.

Also, when the portions where the filling members are mounted come into contact with catch grooves formed in a housing supporter, the assembled helical turbine system is strengthened, and simultaneously is easily assembled/disassembled, so that the workability of the assembly/disassembly process can be improved, and the construction period of the assembled helical turbine system can be shortened.

BRIEF DESCRIPTION OF DRAWINGS

The above and other objects, features and advantages of the present invention will become more apparent from the following detailed description taken in conjunction with the accompanying drawings, in which.

DETAILED DESCRIPTION

Hereinafter, a preferred embodiment of an assembled helical turbine system according to the present invention will be described in detail with reference to the accompanying drawings.

Figure 1:
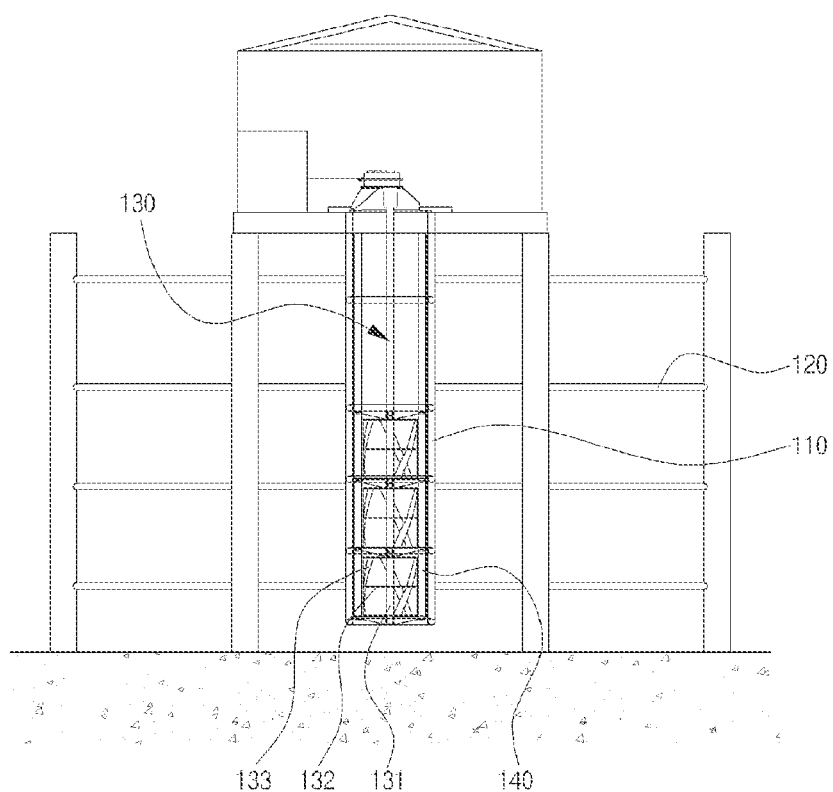
FIG. 1 is a sectional view illustrating a helical turbine generator of a conventional structure.
Figure 2:
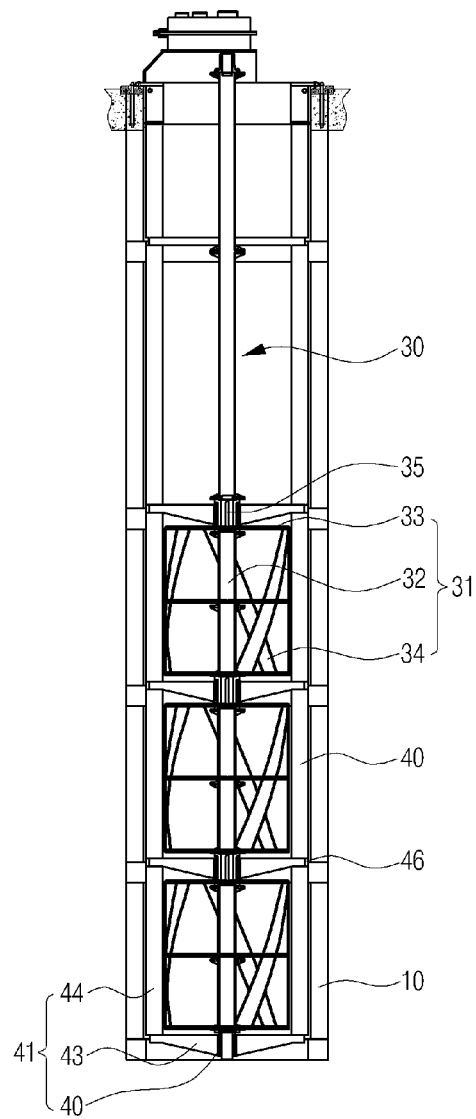
FIG. 2 is a sectional view illustrating an assembled helical turbine system in accordance with a preferred embodiment of the present invention.
Figure 3:
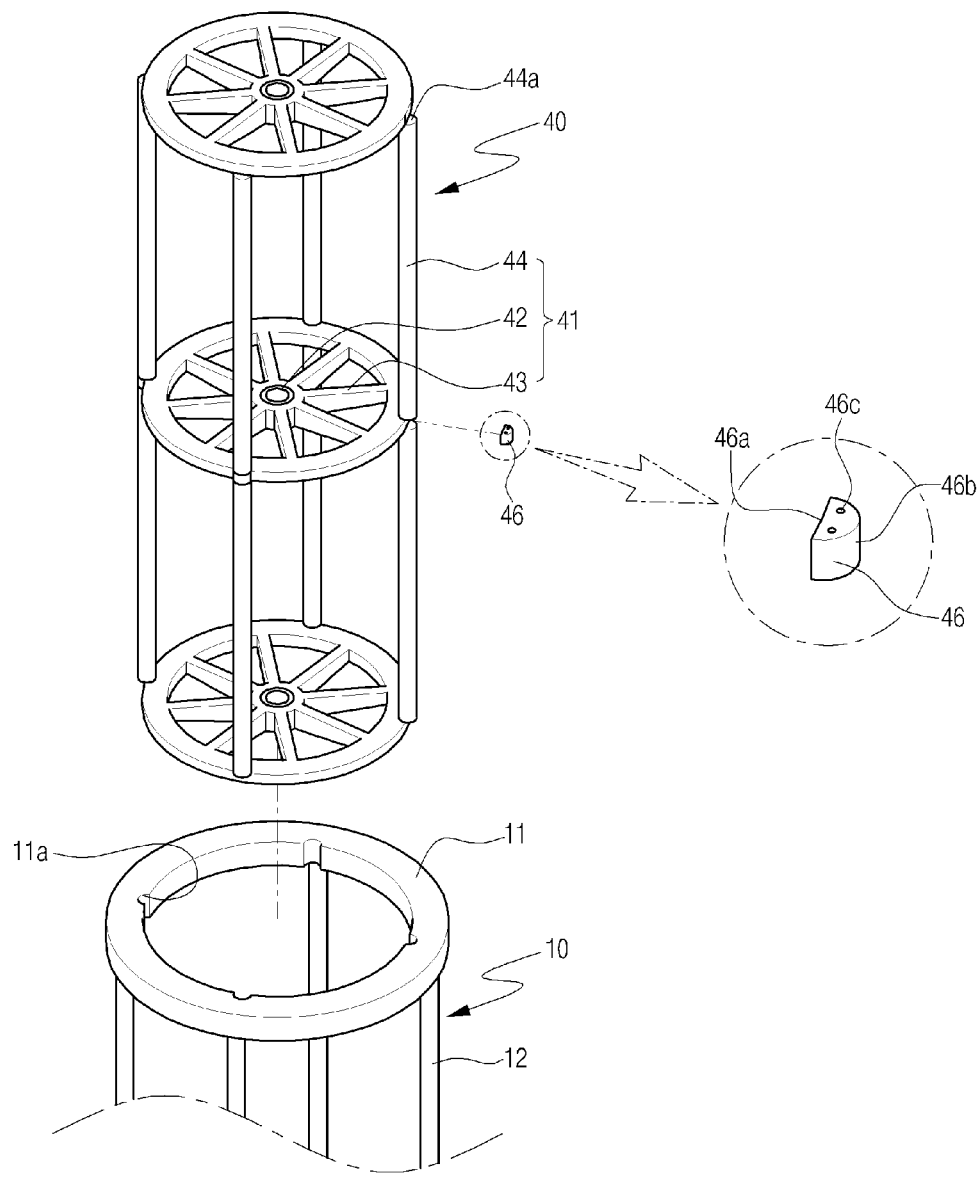
FIG. 3 is a perspective view illustrating a housing assembly in FIG. 2.
Figure 4:
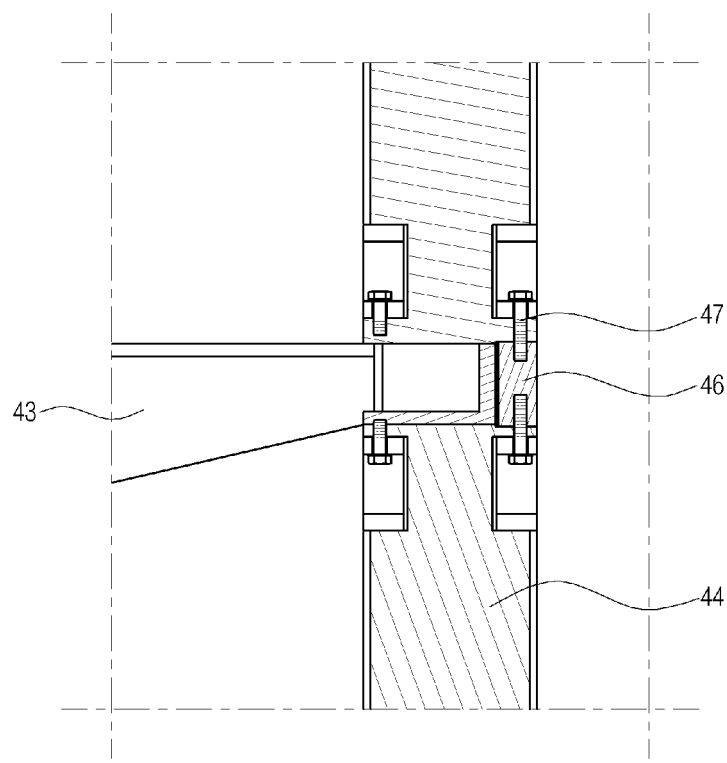
FIG. 4 illustrates in section a portion where a filling member is mounted.

FIG. 2 illustrates an assembled helical turbine system according to a preferred embodiment of the present invention, FIG. 3 illustrates a housing assembly in FIG. 2, and FIG. 4 illustrates in section a portion where a filling member is mounted.

As illustrated in the drawings, the assembled helical turbine system according to this embodiment includes a frame 120 dipped in fluid, a housing supporter 10 provided in the frame 120, and a housing assembly 40 for rotatably mounting a helical turbine assembly 30 in its central portion, the housing assembly 40 being inserted in the housing supporter 10.

The helical turbine assembly 30 has a structure in which a plurality of helical turbines 31 are connected to each other by couplers 35. Each of the helical turbines 31 includes a rotating shaft 32 having a predetermined length, a plurality of supporting members 33 radially protruding from the rotating shaft 32 while being arranged in layers along the rotating shaft 32, and a blade 34 connected to distal ends of the respective supporting members 33, having a streamlined cross section, and helically twisted in the longitudinal direction of the rotating shaft 32. With regard to this, the number of the helical turbines 31 connected to each other by the couplers 35 is determined by installation environment and other factors, and a mechanism for connecting the ends of two adjacent rotating shafts 32 to each other by the coupler 35 is generally formed in a structure in which bolts are screwed into the coupler 35 and the ends of the rotating shafts 32 in the state where the ends of the rotating shafts 32 are fixed by the couplers 35.

The housing assembly 40 has a structure in which a plurality of housings 41 are arranged in layers by screwing bolts (i.e. coupling members) into the housings 41. Each of the housings 41 includes a bearing spider 43 formed in the shape of a round wheel and having, in its central portion, a radial bearing 42 for supporting the rotating shaft 32, and a plurality of side posts 44 longitudinally protruding from the bearing spider 43 in such a manner as to surround the helical turbine 31. The side posts 44 are joined to the bearing spider 43 while the end surfaces of the side posts 44 radially protrude out of the peripheral surface of the bearing spider 43 by a predetermined length, and the protruding portions of the side posts 44 form stoppers 44a. Also, the number of the housings 41 is determined according to how many helical turbines 31 are provided.

Spaces between the peripheral surface of the bearing spider 43 and the outlines of the protruding portions of the side posts 44, that is, spaces formed between the side posts 44 mounted on the upper side of the bearing spider 43 and the side posts 44 mounted on the lower side of the bearing spider 43, are filled with filling members 46. Each of the filling members 46 has an arc-shaped inner surface 46a corresponding to the peripheral surface of the bearing spider 43, and an arc-shaped outer surface corresponding to the outer diameter of the protruding stopper 44a of the side post 44. The upper and lower surfaces of the filling member 46 are formed with female screws 46c through which fixing bolts 47 are screwed. In other words, the filling member 46 is formed in the shape of a column having a crescent cross section.

The housing supporter 10 includes a plurality of circular ring-shaped supporting plates 11 for receiving the housing assembly 40 therein, and a plurality of supporting plate side posts 12, arranged along the rims of the supporting plates 11, for connecting and fixing the supporting plates 11 adjacent to each other. Each of the supporting plates 11 is formed at its inner surface with a plurality of catch grooves 11a that are recessed to a depth corresponding to the height of the protruding stoppers 44a so as to securely engage the stoppers 44a therein.

Although not illustrated, the housing assembly 40 is preferably assembled in such a manner that it forms a trapezoid tapered in a downward direction toward the base side when viewed from the front. That is, the widths of the respective housings 41 become smaller toward the bottom such that the housing assembly 40 forms a trapezoid as a whole when viewed from the front, and each lower housing 41 assembled at the bottom of each upper housing 41 has a tapered inner diameter that is smaller than that of the upper housing 41. Preferably, the housing supporter 10 is mated with the housing assembly 40 in such a manner that it is formed in a trapezoidal shape having an inner inclination corresponding to the inclination of the housing assembly 40. In this way, when the housing assembly 40 and the housing supporter 10 are formed in a trap ezoidal shape, the housing assembly 40 can be easily inserted into and withdrawn from the housing supporter 10.

In the assembled helical turbine system constructed according to this embodiment, the filling members 46 are mounted in the spaces between the protruding portions of the upper and lower side posts 44, which form the stoppers 44a, and thereby the portions connecting the side posts 44 to the bearing spiders 43, which have relatively low strength as compared to other portions, are strengthened.

Further, in order to prevent the helical turbine assembly 30 and thus the housing assembly 40 from being rotated by the flow of tidal currents during their assembly/disassembly process, they are slidingly assembled/disassembled while the stoppers 44 of the side posts 44 are engaged in the catch grooves 11a.

Further, when the portions, in which the filling members 46 are provided, are fixed in a position where they come into contact with the catch grooves 11a of the supporting plate 11, the filling members 46 are mounted in the spaces between the inner surfaces of the catch grooves 11a of the supporting plate 11 and the peripheral surface of the bearing spider 43. As a result, the spaces are reinforced by the filling members 46, and thus the housing assembly 40 can be securely fixed in the housing supporter 10.

In this way, the assembled helical turbine system according to the present invention can improve the fixation force of the side posts 44 and can strengthen portions having relatively low strength by mounting the filling members 46 in the spaces formed between the side posts 44 fixed on the upper and lower sides of the bearing spider 43.

Also, when the portions connecting the side posts 44 to the bearing spider 43 come into contact with the catch grooves 11a of the supporting plate 11, the spaces between the inner surfaces of the catch grooves 11a and the peripheral surface of the bearing spider 43 are filled with the filling members 46, and the filling members are fixed by the fixing bolts 47, so that the housing assembly 40 is strengthened, and the supporting force of the supporting plate is prevented from being reduced by a rotational force acting on the housing assembly 40.

Although a specific preferred embodiment of the present invention has been described in detail for illustrative purposes, those skilled in the art will appreciate that various modifications, additions and substitutions are possible, without departing from the scope and spirit of the invention as disclosed in the accompanying claims, and such modifications, additions and substitutions fall within the scope of the accompanying claims.

What is claimed is:

1. An assembled helical turbine system comprising:
   a helical turbine formed with a plurality of blades in such a manner as to continuously generate a rotational force under unidirectional or multidirectional fluid flow;
   a housing assembly comprising a plurality of bearing spiders for rotatably supporting a rotating shaft constituting the helical turbine, and a plurality of side posts for connecting and fixing the respective bearing spiders to each other, the side posts being fixed in such a manner as to radially protrude by a predetermined length from peripheral surfaces of the bearing spiders;
   filling members for filling and reinforcing spaces between the peripheral surfaces of the bearing spiders and outlines of protruding portions of the side posts, wherein the protruding portions of the side posts form stoppers; and
   a housing supporter for supporting the housing assembly in such a manner that the housing assembly can be inserted into and withdrawn from the housing supporter, the housing supporter having catch grooves that are recessed in a shape corresponding to the stoppers, so as to engage the stoppers.

2. The assembled helical turbine system as claimed in claim 1, wherein each of the filling members has an arc-shaped inner surface corresponding to the peripheral surface of the bearing spider, an arc-shaped outer surface corresponding to an outer surface of the protruding portion of the side post, and upper and lower surfaces formed with female screws through which fixing bolts for joining the bearing spider to the side post are screwed.

3. The assembled helical turbine system as claimed in claim 1, wherein the
   housing assembly is formed in a shape tapered in a downward direction toward the bottom thereof, so as to facilitate insertion/withdrawal of the housing assembly into/from the housing supporter, whereby the housing assembly forms a trapezoid when viewed from the front.

4. The assembled helical turbine system as claimed in any one of claim 1, wherein the housing supporter comprises:
   a plurality of circular ring-shaped supporting plates, each surrounding the housing assembly and formed at an inner surface thereof with the catch grooves; and
   a plurality of supporting plate side posts for connecting and fixing one supporting plate to another supporting plate.

\* \* \* \* \*